W. G. BABCOCK, DEC'D.
B. C. BABCOCK, ADMINISTRATRIX.
TYPE WRITER.
APPLICATION FILED APR. 11, 1901.
989,222.
Patented Apr. 11, 1911.
4 SHEETS—SHEET 2.
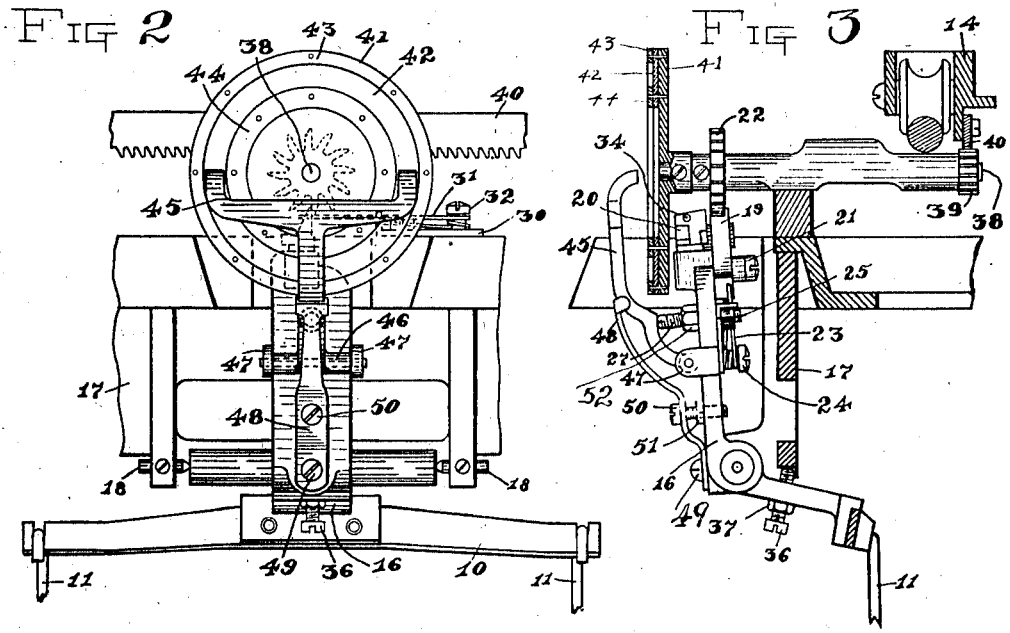
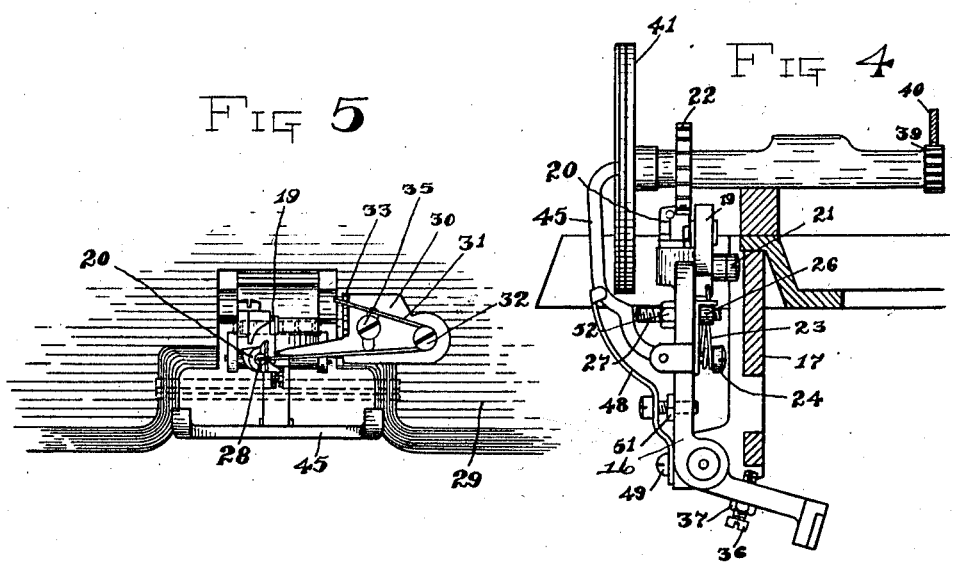
WITNESSES.
Edward G. Neuhaus
Thaddeus W. Rolle
INVENTOR
William G. Babcock
By Frederic W. Beard
ATTORNEY

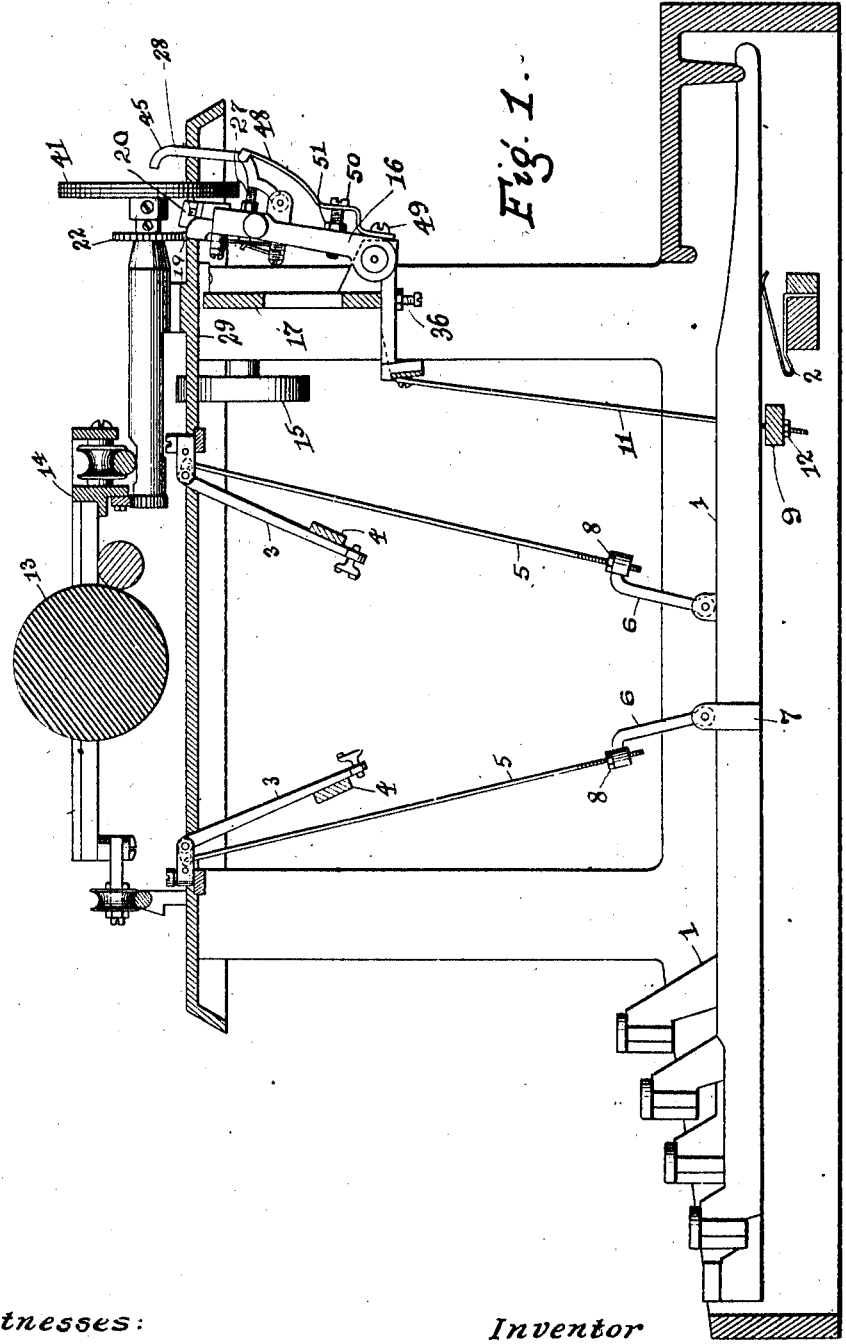

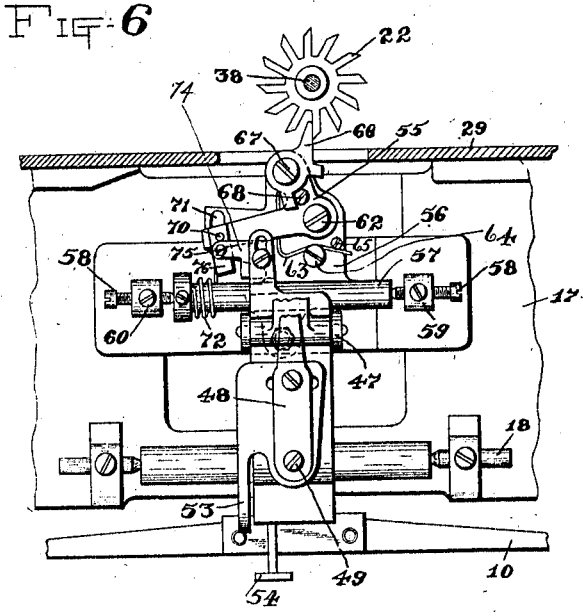
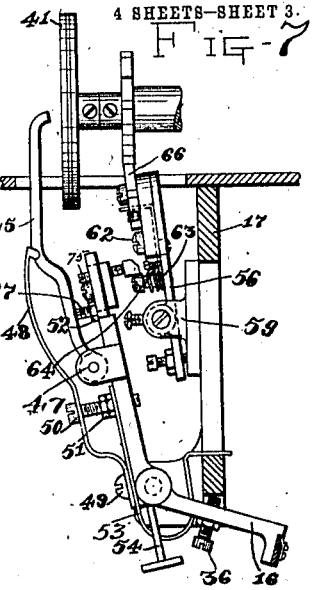
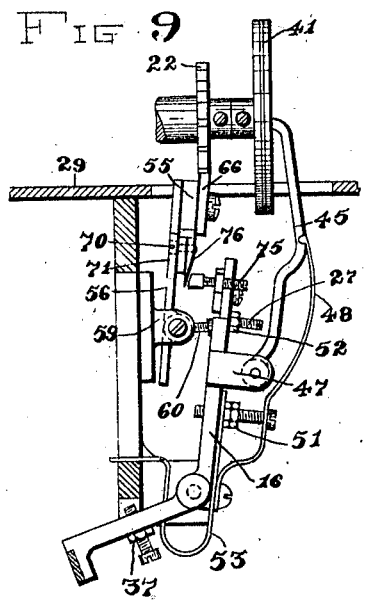
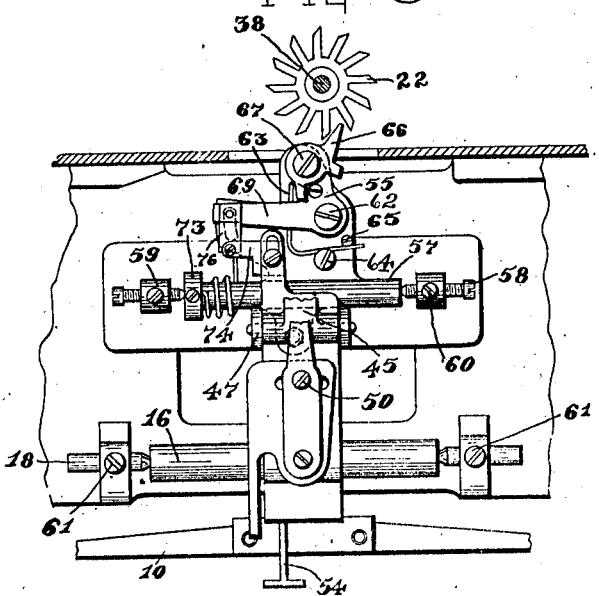

W. G. BABCOCK, DEC'D.
B. C. BABCOCK, ADMINISTRATRIX.
TYPE WRITER.
APPLICATION FILED APR. 11, 1901.
989,222.
Patented Apr. 11, 1911.
4 SHEETS—SHEET 4.
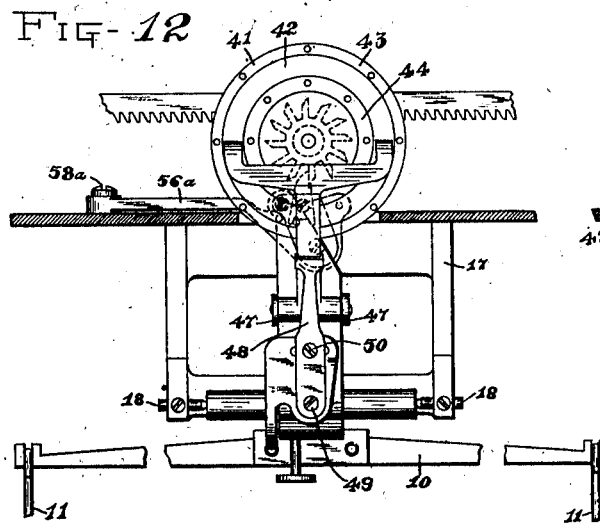
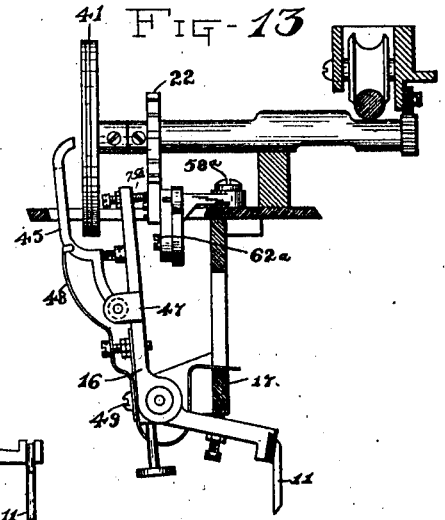
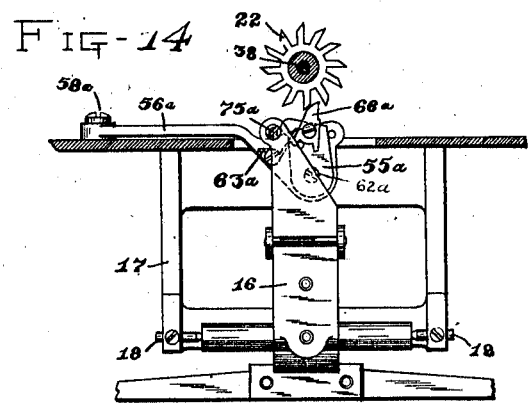
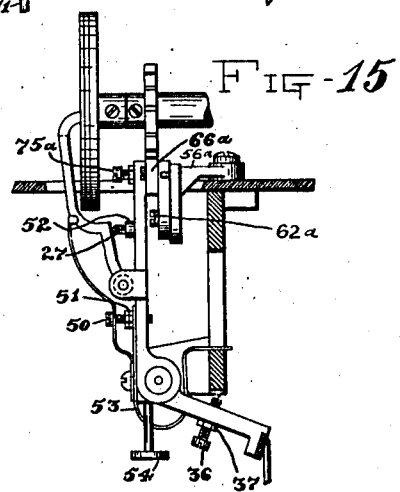
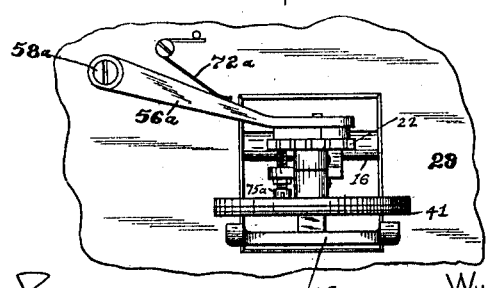
WITNESSES:
Edward G. Neumann
Thaddeus W. Rolle
INVENTOR
WILLIAM G. BABCOCK
BY Frederick W. Hillard
ATTORNEY

UNITED STATES PATENT OFFICE.

WILLIAM G. BABCOCK, OF NEW YORK, N. Y.; BERTHA C. BABCOCK, ADMINISTRATRIX OF SAID WILLIAM G. BABCOCK, DECEASED, ASSIGNOR, BY MESNE ASSIGNMENTS, OF ONE-HALF TO UNION TYPEWRITER COMPANY, OF ILION, NEW YORK, A CORPORATION OF NEW YORK.

TYPE-WRITER.

989,222.      Specification of Letters Patent.      Patented Apr. 11, 1911.

Application filed April 11, 1901. Serial No. 55,307.

*To all whom it may concern:*

Be it known that I, WILLIAM G. BABCOCK, a resident of the borough of Brooklyn, in the county of Kings and city and State of New York, have invented certain new and useful Improvements in Type-Writers, of which the following is a specification.

My invention is an improvement in typewriter escapements, intended for increasing the speed of the letter space carriage feed, decreasing the labor of manipulating the type keys and insuring regular and accurate movement in the operation of the escapement.

In the accompanying drawings, which form a part of this application, Figures 1 to 5 inclusive illustrate one form of my invention, Figs. 6 to 11 inclusive illustrate another form of my invention and Figs. 12 to 16 inclusive illustrate still another form of my invention. Fig. 1 is a side elevation of the #6 Remington typewriter, partly in section, showing one form of my improved escapement mounted thereon, looking at the machine from the right hand side. Figs. 2, 3, 4 and 5 are detail views of the same escapement, Fig. 2 being a rear elevation; Fig. 4 a plan view with the escapement wheel, its support and the rack removed; and Figs. 3 and 4 are sectional side views, Fig. 3 showing the normal position and Fig. 4 the depressed key position of the escapement. Figs. 6, 7, 8, 9, 10 and 11 are detail views of a modified form of the escapement mounted on the #6 Remington typewriter. Fig. 6 is a rear elevation and Fig. 7 a sectional side view of the escapement in its normal position, while Figs. 8 and 9 are corresponding views of the escapement in its depressed key position. Fig. 7 also differs from Fig. 8 in that they are views looking at the machine from opposite sides. Fig. 12, 13, 14, 15 and 16 are detail views of still another modification of the escapement mounted upon the same machine. Fig. 12 is a rear elevation and Fig. 13 a sectional side view of the escapement in its normal position; Figs. 14 and 15 are corresponding views in the depressed key position, with some of the parts shown in Figs. 12 and 13 removed; and Fig. 16 is a plan view with same parts removed.

The key levers 1 are fulcrumed in the machine frame in the usual manner and are held up by the usual key lever springs 2. The type bars 3 are pivotally mounted in the machine in the usual manner, normally resting in the basket 4, and are connected with the key levers by the customary connecting wires 5, and swivels 6. At their lower ends the swivels 6 are hinged to the key lever loops 7 and at their upper ends they are tapped out to receive the lower threaded ends of the connecting wires 5, for lengthening or shortening the connections between the key levers and type bars. The lock nuts 8 are provided for rigidly clamping the connecting wires to the swivels when they have been adjusted to the desired lengths, in the usual manner. The universal bar 9 passes underneath all of the key levers and is connected with the rocker arm 10 by means of the usual connecting wires 11. The lower end of each connecting wire 11 is threaded and a nut 12 is screwed thereon underneath the universal bar 9; said nuts serving to hold up the universal bar and for varying the lengths of the connecting wires between the universal bar and the rocker arm 10. The platen 13 is mounted in the carriage 14 and the carriage is fed forward for letter spacing by the usual spring contained in spring barrel 15, to which the carriage is connected.

The escapement rocker 16 is pivoted to the dependent rocker hanger 17 at the rear of the machine, being supported upon the pivot pins 18 mounted in lugs therein in the usual manner. The normally engaging dog 19 and the normally disengaged dog 20 are of a well known construction, and need not be particularly described here. The normally engaged dog is mounted upon pivot screw 21 and when disengaged from the escape wheel 22 is normally held in a central intermediate position by spring 23, being capable of movement to either side of said central position as is now customary; the spring 23 being coiled about the body of screw 24 and having two upwardly projecting ends which pass through slots in the upper end of spring guard 25, and are separated from each other by a tongue in the spring guard and engage with the downwardly extending end of dog 19, one end of the spring engaging with one side of the dog and the other end of the spring engaging with the other side of the dog in the usual manner. Screw 24, and a nut 26 and screw 27, serve to clamp the spring guard 25 upon the rocker to hold it in proper position thereon.

The normally disengaged dog 20 is swiveled upon the escapement rocker on a pin 28, which pin is driven snugly down into the rocker and upon the upper end of which the dog 20 is pivoted. Upon the top plate 29 of the machine there is adjustably mounted a swiveling plate 30, which plate serves to hold the dog 20 in its rearward position on the escapement rocker when a type key is fully depressed, but permits the dog to be swiveled into its forward position as soon as the key is released, while the rocker is being moved outwardly to disengage dog 20 from the escape wheel and to reëngage dog 19 therewith. Plate 30 may also serve, when the carriage feed is not prevented on the down stroke of the key by the friction brake 45 hereinafter described, (and the adjusting screw 27 is also hereinafter described whereby the brake mechanism is thrown out of action to permit the forward feeding movement of the carriage at will during the down stroke of the keys) as a means by which the carriage can be cammed backward in opposition to the pull of the main spring by a stroke on the key; as well as a means by which the pull of the main spring is instrumental in disengaging the dog 20 from the escape wheel upon the release of the key, and for lifting the key and throwing down the type bar after the printing. This entire mode of operation, varying with the adjustment of screw 27, is fully described in detail hereinafter, and therefore will not be elaborated in the present general statement of operation. The dog spring 31 is coiled about screw 32, its inner end engaging with one of several notches or teeth in the turned up end 33 of the plate 30, while its outer end passes through a hole 34 drilled near the upper extremity of dog 20, the construction being a well known one whereby the spring 31 serves both to return the rocker 16 outwardly on the machine to its normal position after it has been operated, as well as to swivel dog 20 rearwardly thereon. Screw 35 passes through an adjusting slot in the plate 30 and is threaded into the top plate of the machine, and serves together with screw 32 for clamping plate 30 in any desired position upon the top plate. The stop screw 36 and lock nut 37 are provided for limiting the outward movement of the escapement rocker upon the hanger 17 in the usual manner. The escape wheel 22 is mounted near the outer end of the escape wheel shaft 38, and the pinion 39 is mounted at the front end of the escape wheel shaft and meshes with the carriage rack 40.

Mounted at the extreme outer end of the escape wheel shaft 38 is the friction brake disk 41, which is rigidly fastened to the escape wheel shaft for movement therewith. Upon the outer face of the brake disk 41 there is a leather ring 42, held in place on the disk by two metal washers 43 and 44 riveted to the disk.

The friction brake arm 45 is provided at its lower end with a shaft 46, pivotally mounted in lugs 47 upon the escapement rocker. At its upper end the brake arm 45 is forked, one prong engaging with the leather ring 42 upon the left hand side of the shaft 38 and the other prong engaging with the leather ring upon the right hand side of the shaft. The spring 48 is securely fastened at its lower end to the escapement rocker by screw 49 and the upper end of the spring engages with the brake arm 45 and serves to press it inwardly to engage with the leather ring 42. The adjusting screw 50 is threaded into the escapement rocker above the screw 49 and serves to adjust the tension which spring 48 exerts for pressing the brake arm 45 inwardly against the leather covered face of the brake disk 41. The lock nut 51 serves to rigidly clamp screw 50 to the escapement rocker in any desired adjustment. In the normal unused condition of the machine the stop screw 27 engages with the inner face of the brake arm 45 and serves to hold the upper bifurcated end of the brake outwardly on the machine out of engagement from the brake disk 41. The lock nut 52 is provided for clamping the stop screw 27 to the rocker frame in any desired adjustment thereon.

Upon depression of a key the escapement rocker swings inwardly, the adjusting screw 36 coming away from the lower end of the rocker hanger 17, and dog 19 swinging free of the escape wheel and the dog 20 into engagement therewith. During the latter part of the depression of the key the upper bifurcated end of the brake arm, swinging with the rocker, comes into contact with the leather ring 42; after which the brake arm 45 remains stationary in its engagement with brake disk 41, and the stop screw 27, since it is still swinging inwardly with the rocker, comes away from its point of contact with brake arm 45. It will thus be seen that spring 48 constantly presses the upper bifurcated end of brake arm 45 inwardly; and that the inward movement of the brake arm is limited by the screw 27 in the normal unused condition of the machine and may be limited by brake disk 41 whenever a key is depressed. That is, referring particularly to Fig. 3, it is seen that the screw 27 limits the inward movement of brake arm 45 in the normal or unused condition of the machine, and it is obvious that, as the escapement rocker 16 swings inwardly upon depression of a type key, the upper bifurcated end of arm 45 will, if the inward swinging movement is continued, come in contact with disk 41, and then upon further inward movement the stop screw 27, still swinging inward with the escapement rocker, will come away from arm 45. Thus the question whether the inward movement of the free end of arm 45 shall be limited by stop screw 27 or by friction disk 41 upon full depression of a type key, is determined by the extent of the swinging movement imparted to the escapement rocker and the adjustment of the stop screw 27 on the rocker.

Figs. 2, 3 and 5 show the normal position of the escapement rocker in the unused condition of the machine and Fig. 4 shows its position when a type key is depressed. It will be observed in Fig. 3 that the brake arm 45 is in contact with stop screw 27, and free of the brake disk 41; while in Fig. 4 the brake arm is contacting with brake disk 41 and free of stop screw 27. The function of the brake is to frictionally control the carriage in opposition to the pull of the main spring when a type key is depressed for printing and the normally engaged dog 19 is disengaged from the rack. At this time the normally disengaged dog 20 is engaged with the rack and may serve in conjunction with plate 30 to prevent feed of the carriage. This may be accomplished by so adjusting the plate 30 as to swivel the rack holding face of dog 20 into line with the rack holding face of the normally engaged dog 19, whereby the rack and carriage will be held in the same position on full depression of the keys as it is when in normal position. But in case the dog 20 is staggered relatively to dog 19, so that part of the feed is effected with each dog, or in case the plate 30 is so set that the dog 20 can swivel while the key is fully depressed; then in either of these cases the dog 20 will not wholly prevent the movement of the carriage while the key is fully depressed, but the brake arm 45 and the brake disk 41, spring pressed together by the swinging of the escapement rocker and the tension of spring 48, will perform their function of preventing feed of the carriage so long as the key is held down, but will permit the carriage to begin its forward feeding movement the instant the key is released.

It will be understood that I use the term "staggered" in the sense in which it is commonly used in the art; meaning thereby that the two dogs are so set relatively to each other, that part of the carriage feed is effected under control of one dog and part under control of the other dog. Therefore part of the feed occurs upon the down stroke of the type key (i. e., prior to the printing) and part on the upstroke of the key (i. e., after the printing), in machines equipped with staggered dog escapements; and practically the same result follows in the escapement of Figs. 1 to 5, when swiveling plate 30 is so adjusted as to permit a partial swiveling of dog 20 and a corresponding feed of the carriage upon the depression of the key. In either case the carriage will be feeding while the printing is taking place, so that blurring will occur if the key is held down. A function of my friction brake is to prevent the possibility of such blurring, even if the type key is held down, by preventing the feed of the carriage until after the printing has taken place; and a further function is to permit forward feed of the carriage to begin the instant the depressed key is released.

It is apparent that by a proper adjustment of the stop screw 27 for the purpose, and a proper tensioning of spring 48, all feed of the carriage may be prevented until after the release of the depressed key; while on the other hand the spring 48 may be so tensioned as to only check or retard the feed of the carriage while the key is depressed, not actually preventing it altogether; or that stop screw 27 may be so adjusted as to entirely prevent contact of arm 45 with disk 41 when the key is wholly depressed and the printing taking place. Hence, in Figs. 1 to 5, means are provided for controlling the carriage by the escapement during the unused condition of the machine and means are provided for holding it either by friction brake or by escapement at will (i. e., according to the adjustment of the parts) when a type key is depressed.

In the form shown in Figs. 6 to 11 the escapement rocker 16 is pivoted upon lugs on the rocker hanger 17 by the pins 18 in the usual manner, and is provided with the rocker arm 10 connected with the universal bar in the same manner as in the construction already described. The escape wheel 22 is rigidly mounted near the outer end of the escape wheel shaft 38, and the friction brake disk 41 is rigidly screwed upon the outer end of the escape wheel shaft, as in the foregoing construction. The friction brake arm 45 is pivoted to lugs 47 upon the escapement rocker, and is spring pressed inwardly by spring 48, fastened to the rocker by screw 49 and tensioned by adjusting screw 50, provided with a lock nut 51. The escapement rocker is provided with stop screw 36 and lock nut 37 to limit the outward movement of the escapement rocker upon its pivots. The stop screw 27 with its lock nut 52 are also provided for limiting the inward movement of the brake arm 45 on the escapement rocker and for holding it normally free of the leather covered face of the brake disk. When a key is depressed it swings the rocker inwardly, causing the upper bifurcated end of the brake arm to engage the leather covered face of the brake disk 41 during the latter part of the depression of the key. All of the above described parts are substantially the same and operate in the same manner as in the construction shown in Figs. 1 to 5 inclusive.

Figs. 6 and 7 show the normal positions of the parts in the unused condition of the machine and Figs 8 and 9 show their positions when a key is fully depressed. In Fig. 7 the brake arm 45 is held outwardly free of the brake disk 41 by stop screw 27. In Fig. 9 the upper bifurcated end of brake arm 45 has been swung inwardly into engagement with the brake disk 41 by the swinging of the escapement rocker, and then the continued inward movement of the rocker has swung stop screw 27 still farther inward out of contact of the brake arm, so that the brake arm is spring pressed inwardly by spring 48, against the leather covered face of the brake disk and can perform its function of holding the carriage from spacing while a type is fully depressed. I have mounted upon the escapement rocker the returning spring 53 and an adjusting screw 54 therefor, of a well known style, and they need not be more particularly described here, since they form no part of my present invention.

In the form of the device which I am now describing, a single dog only, consisting of two parts pivoted together, the lower or main part 55 and the upper rack engaging part 66, is provided for engagement with the escape wheel. This dog is not mounted upon escapement rocker 16, but is pivoted to a dog rocker 56, which rocker is provided with a rock shaft 57 and is independently mounted upon the hanger 17 by pivot screws 58 in lugs 59. Clamping screws 60 are provided to hold the pivot screws 58 securely in their proper adjustment in the lugs 59 and the usual clamping screws 61 hold the pivot pins 18 in their proper adjustments in the lugs provided therefor on the rocker. The lower part 55 of the dog is pivoted upon the dog rocker by the pivot screw 62 and is normally spring pressed into its rearward position thereon by spring 63, which spring is coiled about screw 64 and has one end extending toward the right (in Figs. 6 and 8) and passing underneath a small screw or pin 65, which serves to tension the spring and press its opposite or left hand end upwardly against the rack engaging pivoted upper part 66 of the dog. The spring 63 thus serves to space the lower part 55 of the dog rearwardly (or to the right in Figs. 6 and 8) upon the dog rocker, when the upper part 66 of the dog is disengaged from the rack; and since the spring bears against the upper part 66 of the dog below its pivot screw 67, it also serves to space the upper part of the dog into its forward position (or to the left in Figs. 6 and 8), on the lower part 55 thus effecting a relative movement between the lower part 55 and the upper part 66 of the dog, and to normally hold it there in engagement with stop pin 68 when the dog is disengaged from the escape wheel; but when the carriage is moved backward toward its starting point for a new line of print, the spring 63 first causes the lower part 55 to swing into its rearward position on the dog rocker, and then permits the upper part 66 to be swung rearwardly thereon, so as to fully trip the upper dog part out of the escape wheel, thus permitting of the retraction of the carriage. The upper dog part 66 is provided with two downwardly extending lugs for engagement with stop pin 68, one to limit the forward movement of the upper dog part on the main dog part 55 and the other to limit the rearward movement thereon. The main dog part 55 is provided with a horizontal arm 69 (extending toward the left in Figs. 6 and 8) and near the free or left hand extremity of this arm is a screw or pin 70, fastened in the arm 69 and extending through a slot 71 in the dog rocker, thereby limiting the forward and backward movements of the dog 55 about its pivot 62 upon the dog rocker 56.

The dog rocker is provided with a coiled spring 72, one end of which is inserted in the collar 73, securely clamped to the shaft of the dog rocker, and the other end of which bears against the rocker hanger 17, thus serving to normally hold the dog rocker outwardly upon the machine, in which position the upper dog part 66 is in line with and engages the escape wheel 22 to control the carriage in opposition to the pull of the carriage main spring. Near the upper end of the escapement rocker is a driver 74 adjustably clamped to the escapement rocker by a screw passing through a slot provided to receive it at the upper end of the escapement rocker. Through this driver is passed an adjusting screw 75 which is slotted at its outer threaded end and provided at its inner end with an enlarged head for engagement with a downwardly projecting wedge shaped piece 76 clamped to the dog arm 69 by means of screw 70. The engaging face of the screw head 75 is beveled off at its upper edge, and the face of the wedge shaped piece 76 on dog arm 69 is correspondingly beveled at its lower edge, for a purpose which will presently be described. Normally the screw 75 is free of the part 76. But upon the depression of a type key for printing, as the escapement rocker 16 is swung inwardly, the inner headed end of the screw 75 contacts with the part 76, thus serving to swing the dog rocker 56 inwardly and disengage dog part 66 from the escape wheel. Slightly before upper dog part 66 passes out of the escape wheel the brake arm 45 contacts with the leather covered face of the brake disk and serves to hold the carriage from advancing under the pull of the main spring while the key is held down. As soon as the upper dog part 66 has been swung inwardly free of the escape wheel, the lower dog part 55 swings rearwardly upon the dog rocker under the influence of its spring 63, thereby bringing the upper dog part 66 in line with the next succeeding tooth of the escape wheel, as shown in Fig. 8. This movement of the part 55 swings the arm 69 upwardly and frees part 76 from screw 75, so that the dog rocker can again swing outwardly under the influence of its spring 72, thus causing the upper dog part 66 to swing into line with and enter the succeeding tooth of the escape wheel. The wedge 76 is freed from screw 75, in the operation last described, not by passing the upper edge of the screw but because the wedge is tapered from its upper to its lower edge, being thinner at the lower than at the upper end; so that, while it is pressed against at its thick upper end by the screw at the beginning of the stroke on the key (as illustrated in Fig. 10), its lower tapered and thin end is out of actual contact with the screw at the end of the stroke, although still in line therewith (as illustrated in Fig. 11). Therefore in this position of the parts the escapement rocker is held inwardly by the depressed type key while at the same time the dog rocker has again swung outwardly upon the machine. As soon as the key is released, thereby releasing the brake disk 41 from control of the brake arm 45, the force of the main spring is transmitted through the carriage and escape wheel to the engaging part 66 of the dog, and tends to swing the entire dog into its forward position upon the dog rocker. The force of the main spring therefore then tends to swing the horizontal dog arm 69 downwardly, and to thus force the wedge shaped piece 76 down against the beveled face on the driving screw 75. By this means the force of the main spring is transmitted through the beveled faces of part 76 and screw 75 to swing the escapement rocker outwardly upon the machine, to lift the depressed type key and to move its connected type bar from the platen toward its position of rest in the type bar basket. The beveled faces upon the part 76 and screw 75 thus serve as a means for transmitting the force of the main spring through the escapement to return the escapement rocker to normal position, lift the depressed type key and throw back the connected typa bar. In the claims I broadly designate the type bars as printing members.

Figs. 10 and 11 show enlarged detail views of the engaging faces of the screw 75 and dog part 76, Fig. 10 showing the parts after screw 75 has been engaged with face 76 of arm 69 during the first part of the depression of a key, and before the dog 66 has been disengaged from the escape wheel; and Fig. 11 showing the position of the parts upon the full depression of a key.

In the present form of my invention the dog 66 serves to control the carriage in opposition to the pull of the main spring in the normal unused condition of the machine and the brake arm 45 and brake disk 41 acting together may serve to control the carriage in opposition to the main spring to prevent all feed thereof as long as a key is held down, after dog 66 has been disengaged from the escape wheel, but permits the carriage to be immediately drawn forward by the main spring upon the release of the key.

In the form shown in Figs. 12 to 16 the escapement rocker 16 is pivoted to the hanger 17 by pivot pins 18 and is provided with rocker arm 10 connected to the universal bar by the usual connecting wires 11. The escape wheel 22 is rigidly mounted near the outer end of the escape wheel shaft 38 and the friction brake disk 41 is rigidly screwed on the outer end of the escape wheel shaft, the friction disk being of the same construction as in the previously described escapements and having the leather ring 42 and the washers 43 and 44 riveted to the disk. The friction brake arm 45 is pivoted to lugs 47 and spring pressed inwardly by spring 48, and its inward movement on the rocker is normally stopped by screw 27.

All of the above described parts are the same and are provided with the same means of adjustment as in the foregoing construction, and the returning spring 53 and its adjusting screw 54 are also the same on this escapement as in the last described foregoing one. I need not describe these devices more fully here because I have previously described them in connection with the foregoing escapements; but will state generally that where the parts in the escapement which I am now describing are similar to the parts described with the foregoing escapements, I wish to have it understood that they operate in the same manner. In this escapement, as in the one illustrated in Figs. 6 to 11, a single dog only is provided for engagement with the escape wheel. But the dog rocker is somewhat different. In the present escapement the lower dog part 55ª is pivoted to the dog rocker 56ª by pivot screw 62ª and is normally spring pressed into its rearward position thereon by spring 63ª. The spring 63ª serves to space dog part 55ª rearwardly as a whole upon the dog rocker and to space the upper dog part 66ª into its forward position upon the lower dog part 55ª, when disengaged from the escape wheel, as described in connection with the escapement illustrated in Figs. 6 to 11. The upper dog part 66ª is pivoted to the lower dog part 55ª and is provided with lugs and a stop pin to limit its forward and backward movements upon the dog part, and pins or stops are provided for limiting the forward and backward movements of the main dog 55ª upon the dog rocker 56ª.

The dog rocker is pivoted to the top plate 29 of the machine by its pivot screw 58ª and the escapement rocker is provided with an adjustable driving screw 75ª, which contacts with the upper dog part 66ª during the depression of a key, thus serving to swing the dog rocker 56ª and the dog part 55ª inwardly to disengage dog part 66ª from the escape wheel. As soon as dog part 66ª has been disengaged from the escape wheel, the dog part 55ª is swung rearwardly upon the dog rocker 56ª by spring 63ª, thus bringing the upper dog part 66ª in line with the next succeeding rack tooth. But during this movement the part of the dog 55ª which was in contact with, and being driven by driving screw 75ª, has swung out of line of screw 75ª, and accordingly the dog rocker is again swung outwardly upon the machine by its spring 72ª, swinging dog part 66ª into line with the escape wheel and causing it to enter the succeeding tooth thereof next to the one from which it had been disengaged. In the operation of this escapement, upon depression of a key the brake arm 45 swings inwardly with the escapement rocker 16, until its upper bifurcated end collides with the leather covered face of the brake disk 41. The brake arm then remains stationary in contact with the brake disk, and the brake, considered as a whole including brake arm 45 which swings with the escapement rocker and the brake disk 41 which is operatively connected with the carriage for movement therewith, is in operative position for controlling the carriage. Upon further depression of the key the dog part 66ª, still swinging inwardly, is moved wholly out of the line of the escape wheel, in which position of the parts the carriage is freed from the dog and under control of the friction brake. The friction brake will then prevent all the feeding of the carriage until after the release of the depressed key, if the tension of spring 48 is strong enough to prevent the pull of the carriage main spring from revolving the disk 41. The friction brake is shown in its inoperative position in Fig. 13 and in its operative or carriage controlling position in Fig. 15.

Preferably either the engaging end of the driving screw 75ª, or the part of dog 55ª with which it contacts, or both screw and dog, should be beveled in a manner similar to that in which the screw 75 and wedge shaped piece 76 are beveled, in the construction of Figs. 6 to 11; so that the force of the carriage propelling power may be instrumental in returning the escapement rocker to normal position, lifting the depressed key and throwing down its connected type bar.

It is obvious that the escapements illustrated in Figs. 6 to 11 and in Figs. 12 to 16 are "speed escapements," because they release the carriage for a substantial portion of its letter space feed prior to the printing; and that the escapement illustrated in Figs. 1 to 5 will be a "speed escapement" if the two dogs are staggered in respect to each other, or if the plate 30 is so placed as to permit the dog 20 to swivel prior to the release of the key, thereby releasing the carriage for a substantial portion of its feed prior to the printing. By the means herein described I employ a friction brake with a "speed escapement" and still prevent all feed of the carriage until after the printing has taken place. And by the means which I have provided for changing the tension of the brake spring 48, as well as by the ordinary means in the machine for changing the tension of the carriage main spring, I am enabled to use the friction brake to entirely prevent feed of the carriage while the brake members are in operative relation to each other, or I can merely check the feed of the carriage at will thereby. Or if I wish to do so, I can adjust screw 27 so far out as to hold the brake arm 45 rearwardly of and free of the brake disk 41 at all times. It is thus obvious that, by equipping the machine with a speed escapement and also with the friction brake, I can at will release the carriage for a substantial part of its letter space feed prior to the printing or prevent all feed thereof until after the printing has been effected. By the forward movement of an escapement dog on the rocker I mean the direction in which it moves under the influence of the carriage propelling power, and by its backward or rearward movement thereon I mean its movement in the opposite direction. By the term "a normally engaged dog only," as used in the claims, I mean that the ordinarily normally disengaged dog in the escapement is dispensed with. Thus in the form shown in Figs. 6 to 11 and in the form shown in Figs. 12 to 16, the escapement is provided with "a normally engaged dog only"; while in the form shown in Figs. 1 to 5 there is the usual normally disengaged dog as well as the normally engaged dog. I do not wish to limit the meaning of the term "a normally engaged dog only" to any particular style of dog, but merely employ the term to indicate that I dispense with the usual normally disengaged dog in the escapement. In some escapements, instead of a normally engaged dog and a normally disengaged dog, two racks are employed, a normally engaged rack and a normally disengaged rack, such as patent to Barron No. 295,475 of Mar. 18, 1884 or patent to Hillard No. 580,281 of Apr. 6, 1897 (Figs. 8 and 9). I consider such racks the mechanical equivalent of the normally engaged dog and the normally disengaged dog; and I intend to include within the term " a normally engaged dog only * * * which engages with the rack" any style of normally engaged dog and rack or their mechanical equivalent.

Having thus described my invention, and without limiting myself to the precise details shown, what I claim and desire to secure by Letters Patent is:—

1. In a typewriter feed mechanism, the combination of a normally engaged dog and rack, a key, means controlled thereby for disengaging said dog and rack, a normally disengaged friction brake adapted to control the carriage when said dog and rack are disengaged, and means for releasing the carriage from control of said brake upon release of the key.

2. In a typewriter feed mechanism, the combination with normally engaging escapement members, of a friction brake having members normally in inoperative relation with each other, type keys and means operated thereby for disengaging said escapement members and throwing said brake members into operative relation with each other to prevent the forward movement of the carriage prior to the printing.

3. In a typewriter feed mechanism, the combination of a rack in one member of the escapement and a dog in the other member normally engaged with each other, a friction brake having members normally in inoperative relation with each other, type keys and means operated thereby for disengaging said dog from the rack and throwing the members of said brake into operative relation with each other to control the carriage for letter spacing.

4. In a type-writing machine, the combination of a carriage, carriage propelling power, an escapement and a friction brake, means for normally holding the carriage by the escapement, and for holding it by said brake for letter spacing when a type key is depressed.

5. In a typewriting machine, the combination of a carriage, carriage propelling power, a type key, an escapement adapted to release the carriage for a feeding movement prior to the printing, a friction brake and means operated by the key for positioning the friction brake to prevent said feed until after the printing.

6. In a typewriting machine, the combination of a carriage, carriage propelling power, a type key, an escapement adapted to release the carriage for a feeding movement upon depression of the key, a friction brake and means operated by depression of the key for positioning the friction brake to prevent said feed as long as the key is held down.

7. In a typewriting machine, the combination of a carriage, carriage propelling power, a type key, an escapement adapted to release the carriage for a feeding movement upon depression of the key, a friction brake and adjusting means for the friction brake whereby said feeding movement may be prevented by the friction brake, or permitted while the key is held down.

8. In a typewriter escapement, the combination with the carriage and carriage main spring, of a rack having a single series of ratchet teeth, and a single dog adapted to engage said ratchet teeth, means for normally engaging the dog and the rack with each other, means operated by a key for disengaging the dog and rack, and means for reëngaging the dog and rack, prior to the release of the said operating key.

9. In a typewriter escapement, the combination of one rack only in one member, with but a single series of teeth, and one dog only in the other member, which normally engages with the rack, means operated by depression of a key for disengaging one of said parts from the other, and means for releasing the disengaged part from the key and for reëngaging it with the rack while the key is held down.

10. In a typewriter escapement, the combination, with two toothed parts, one of which is fed under control of the other, and one of which consists of a series of teeth to successively engage with the other toothed part, keys operatively connected with one of the toothed parts for effecting movement of a tooth thereon relatively to the other part and means operative upon the said movement of said tooth for disengaging the said tooth from the key, and for permitting its return movement independently of the key.

11. In a typewriter escapement, the combination of a rack operatively connected with the carriage for movement therewith, a dog rocker with a dog pivoted thereon which normally engages the rack, an escapement rocker having a driver, a key operatively connected with the escapement rocker and driver to swing said dog out of line of the rack, means for releasing the dog from the driver, and a spring for swinging the dog rocker back to its normal position to reëngage the dog with the rack while the key is depressed, substantially as described.

12. In a type-writer feed mechanism, the combination of a rack and one member of a friction brake, both operatively connected with the carriage for movement therewith, a dog rocker with a dog pivoted thereon which normally engages the rack, an escapement rocker operatively connected with the keys and having a driver to swing said dog out of line of the rack, a second member of the friction brake mounted for movement with said escapement rocker, normally free of said first mentioned brake member, but which is swung into engagement therewith by the movement of the escapement rocker and controls the carriage while the carriage is free from control of the dog, substantially as described.

13. In a type-writer escapement, the combination of a rack in one member having a single series of ratchet teeth only, and a normally engaged dog only in the other member which engages with the rack, means operated by depression of a key for disengaging the dog from the rack, means for releasing the dog from the key and for reengaging it with the rack, and means operated by the carriage propelling power for moving the dog when reëngaged with the rack to lift the key and throw back its connected type bar toward normal position, substantially as described.

14. In a typewriting machine, the combination of a carriage, carriage propelling power, an escapement having members which normally engage together to hold the carriage in the unused condition of the machine, a brake having members which are normally disengaged, means operated by depression of a key for disengaging said escapement members and throwing the brake members into engagement to hold the carriage while the key is depressed, and means actuated by the carriage propelling power tending to start the depressed key back to its raised position as soon as it is released.

15. In a typewriting machine, the combination, with a printing member, of a carriage, carriage propelling power, an escapement having members which normally engage together to hold the carriage in the unused condition of the machine, a brake having members which are normally disengaged, means operated by depression of a key for moving the printing member to print and for disengaging said escapement members and throwing the brake members into engagement to hold the carriage while the key is depressed, and means actuated by the carriage propelling power tending to move the printing member toward its normal position as soon as the key is released.

16. In a typewriting machine, the combination of a carriage, carriage propelling power, an escapement comprising an escapement wheel and a dog that normally engages the teeth thereof, a friction brake having a friction wheel and a brake arm normally in inoperative relation to each other, means operated by the carriage propelling power for feeding the engaging teeth of the escapement wheel and the periphery of said friction wheel, with the carriage and relatively thereto at a rate of speed higher than that at which the carriage is fed, and key operated means for disengaging the dog from the escapement wheel and for throwing the brake arm against the friction wheel to control the carriage by pressure applied to the key, substantially as described.

17. In a typewriting machine, the combination of a carriage, carriage propelling power, an escapement comprising an escapement wheel and a dog that normally engages the teeth thereof, means operated by the carriage propelling power for feeding the engaging teeth of the escapement wheel with the carriage and relatively thereto at a rate of speed higher than that at which the carriage is fed, a friction brake, means for holding the carriage against the pull of the carriage propelling power by the escapement during the unused condition of the machine and means for controlling it by said brake when a key is depressed, substantially as described.

18. In a typewriting machine, the combination of a carriage, carriage propelling power, an escapement, and a friction brake having a friction wheel and a brake arm normally in inoperative relation to each other, means operated by the carriage propelling power for feeding the periphery of said friction wheel with the carriage and relatively thereto at a rate of speed higher than that at which the carriage is fed, means for holding the carriage against the pull of the carriage propelling power by the escapement during the unused condition of the machine and means for controlling it by said brake when a key is depressed, substantially as described.

19. In a typewriting machine, the combination with a power propelled carriage and an escapement, of a friction brake comprising a key operated part and a power propelled part, both parts mounted independently of the carriage and its propelling mechanism, but being operatively connected to control the carriage irrespective of the escapement by pressure on the key.

20. In a typewriting machine, the combination with a power propelled carriage, of a rack member supported independently of the carriage but connected thereto for feeding movement, a dog which normally engages with the rack, a friction brake having a part on the rack member and moving therewith, and a part normally free of the rack member, and means operated by a key for disengaging said dog from the rack and simultaneously throwing the two parts of the friction brake into operative relation to control the carriage by the key.

21. In a letter spacing mechanism for typewriting machines, the combination with a carriage, of an escapement therefor, and a key operated brake acting on the carriage to control the letter spacing movement thereof.

22. In a letter spacing mechanism for typewriting machines, the combination with a carriage, of an escapement therefor, and a brake consisting of a power propelled part, connected to but supported independently of the carriage, and a key operated part contacting therewith to control the movement of the carriage.

Signed by me in New York city, this 30th day of March, 1901.

WILLIAM G. BABCOCK.

Witnesses:
EDWARD G. NEUHAUS,
GEORGE A. NEURHOFER.